June 6, 1944.  R. A. E. GUICHARD  2,350,754
DEVICE FOR FILING DOCUMENTS
Filed May 4, 1940   2 Sheets-Sheet 1
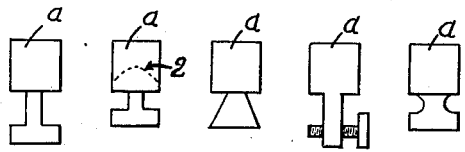
Fig.1  Fig.2  Fig.3  Fig.4  Fig.5
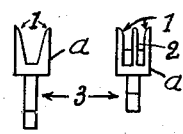
Fig.6  Fig.7
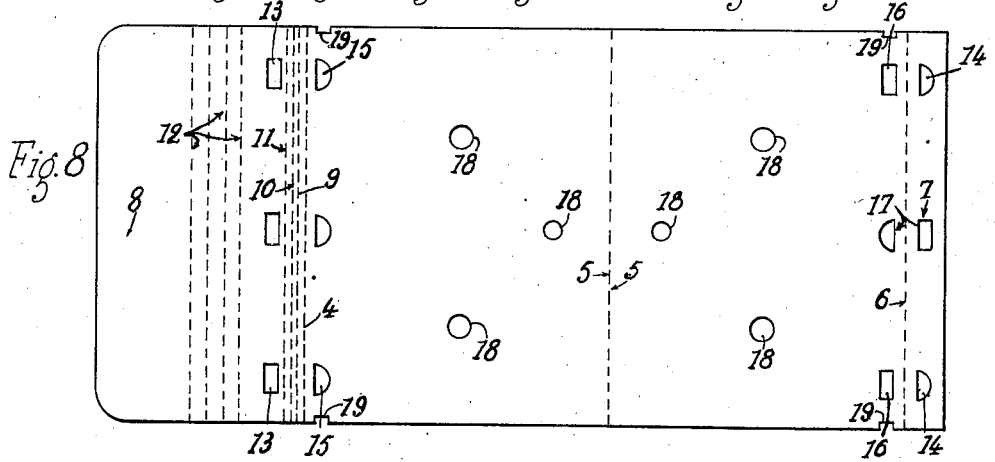
INVENTOR:
RAYMOND ARTHUR EUGENE GUICHARD
BY Haseltine Lake & Co. ATTORNEYS

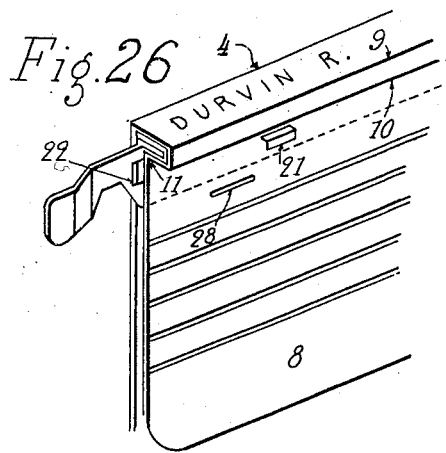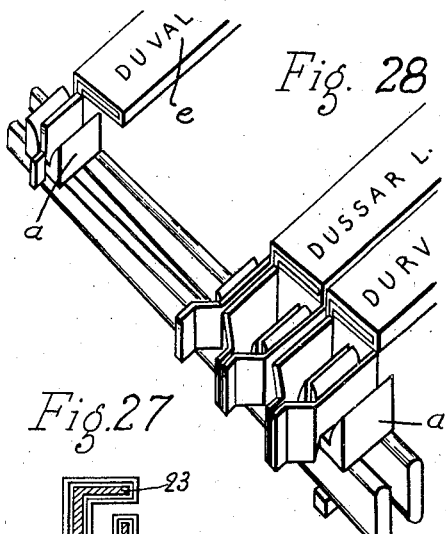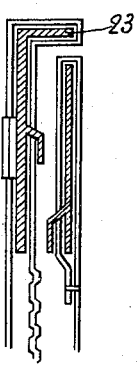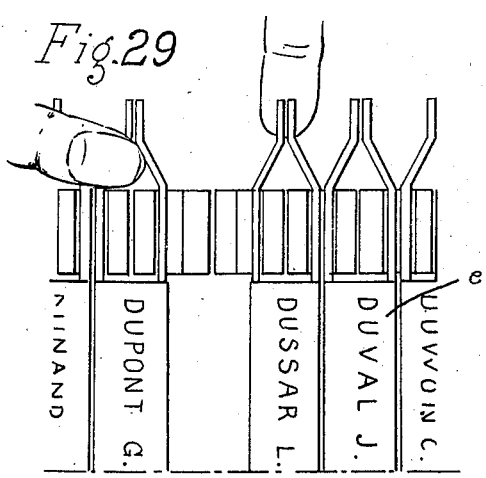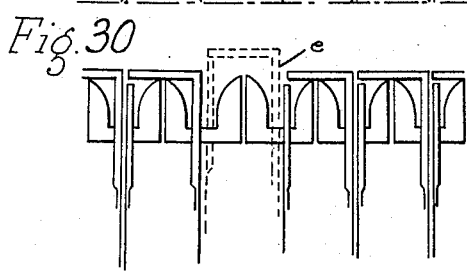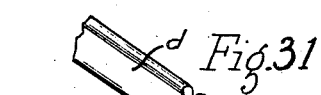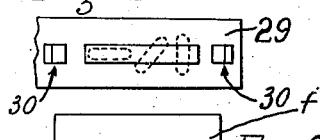

Patented June 6, 1944

2,350,754

UNITED STATES PATENT OFFICE 2,350,754

DEVICE FOR FILING DOCUMENTS

Raymond Arthur Eugène Guichard, Paris, France; vested in the Alien Property Custodian Application May 4, 1940, Serial No. 333,335
In France May 20, 1939

4 Claims. (Cl. 129—16)

The present invention relates to a new filing device allowing the work to be easily and rapidly effected while necessitating the minimum of movements, either for placing a document in the rack or file, for removing it from the cabinet containing it or for refiling it, ensuring at the same time entire safety for placing the documents in position or refiling the racks or files.

This device is constituted by a combination which allows, if need be, of assembling the racks by connecting them to each other, while leaving them independent from each other, said combination being formed by means of elements some of which are known per se and others constitute novelties which will be described hereinafter, viz.:

(a) Removable members serving as supports and guides for the racks and sliding on the parallel bars of a frame or tray.

(b) Racks or envelope-files made of cardboard in preference to any other material, hereinafter called "racks" provided with perforations for securing suspension rods or bars, one on each folio, and, if necessary, with two flaps.

(c) Rods or bars, preferably made of metal, the shape and height of which can be different, ensuring the suspension of the rack and the ends of which issue from said rack and rest on the removable members and extend slightly beyond the same for allowing the manipulations and the extraction of the rack to be effected.

(d) A frame or tray allowing the placing in position of the removable members and their sliding movement as well as the suspension of the racks.

The inscriptions on the rack are very visible because they can be held horizontally or semi-vertically by a fold of one of the suspension rods, said rack can be opened by simply moving back one of its folios according to its position in the cabinet, the documents contained in the rack can be retained at the rear by an inner flap provided in the rack; a new document can be rapidly placed in position, a single movement being sufficient for introducing it.

The manipulation and removal of a rack is very easy, the rods extending beyond the rack and the removable members being folded and curved at their ends, which allows of pushing it back or even of grasping it, using only one hand.

When removing a rack, the removable members mark the place of said rack, that is to say, an empty space remains in the cabinet. The use of said members does not allow a rack to be placed in the frame if said rack or another rack has not been removed previously, as, if a new rack is to be added to the cabinet, it is necessary to arrange at the desired place on either side of the frame, a new member adapted to support the suspension rods.

The removable members can be provided with a label bearing the title of the rack and the racks removed can thus be known.

The removable members can have different shapes, but it is advantageous that each pair, one on either side of the frame should maintain the rod of the rear folio of a rack and that of the front folio of the adjacent rack, so that a document cannot be introduced between two racks, which might take place if the racks were not connected to each other, that is to say, if the rods were held, for instance, by separate members.

Accordion-shaped arrangements have already been constructed, but these systems present serious difficulties.

A. When a new rack is to be interposed, it is necessary to disconnect the accordion, which necessitates the removal of the adjacent racks.

B. These racks present the inconvenience that they cannot be removed from the cabinet for filing and consulting the documents, use is consequently made of an intermediate file which can quite easily be placed in another rack: mathematically, nothing will cause this error to be noticed, in case of need, and it will be necessary to search in all the racks to find the file placed in the wrong rack, this being a laborious task when the cabinet comprises a few thousand racks.

C. When opening the rack, the file containing the documents tends, under the rearward movement, to come forwardly, and it is therefore necessary to disengage it for placing a new one therein, which requires a supplementary movement.

D. Nothing allows one to see whether the rack contains its documents or not.

The present invention remedies these inconveniences and includes other features which will be described and claimed hereinafter.

The invention will now be described with reference to the accompanying drawings given by way of example and which illustrate various forms of removable members, racks, rods and suspension frames devised according to the invention.

Figs. 1, 2, 3, 4 and 5 illustrate support members for filing folders adapted to slide on rails according to the invention.

Figs. 6 and 7 illustrate the members of Figs. 1 and 2 as seen from the side, while Fig. 8 illustrates a folder in substantially flat condition.

Fig. 9 is a side elevation of a supported bar for a folder adapted to rest with the ends thereof in the slidable supporting members of Figs. 1 to 5.

Fig. 10 is an end view of the same.

Fig. 11 is a side elevation of another supporting bar for the folder, while

Fig. 12 is an end view thereof, and

Fig. 13 is a top plan view of the same.

Figs. 14 through 18 are end profile views of supporting rails or rods, etc., for supporting the slidable members of Figures 1 through 5.

Fig. 19 is a perspective view of support rails spaced apart and secured together to form a stand with one slidable support member mounted on the rails to illustrate its proper position thereon.

Fig. 20 is an end profile view of the supporting rails of Fig. 14 with the slidable member of Fig. 1 initially inserted.

Fig. 21 is a similar view of the rail of Fig. 15 with the slidable member of Fig. 2 initially inserted.

Figs. 22 and 23 are further views of the parts of Figs. 20 and 21 with the slidable members partly rotated through a quarter turn to prevent accidental removal thereof from the rails.

Fig. 24 illustrates a further slidable member, while

Fig. 25 includes the rails of Fig. 14 showing the member of Fig. 24 slidably engaging thereon.

Fig. 26 is a fragmentary perspective of the folder of Fig. 8 with the supporting bar of Fig. 9 in place.

Fig. 27 is a vertical section of the upper part of a folder with the rods of Figures 9–12 in place, while Fig. 28 is a fragmentary perspective view showing supporting rails with a group of folders supported at one end thereon.

Fig. 29 is a top plan view of one end of such a group of folders, while

Fig. 30 is an end view of the same.

Figs. 31–34 illustrate minor details of auxiliary indicia and securing and supporting members and rails.

Figs. 1, 2, 3, 4 and 5 illustrate various forms of removable forked members a made of metal or moulded material which serve as supports for the rods allowing the racks to be hung therefrom. Their dimensions can vary according to the importance of the racks. Their shape has been calculated so as to ensure their stability and to allow them to be easily placed in position and to slide on the parts of the frame or tray adapted to support them.

The heel-pieces of the members shown in Figs. 1, 2, 3 and 5 and the screw of that in Fig. 4 are adapted to prevent them from overturning when the thrust is exerted for opening the rack.

Figs. 6 and 7 illustrate the same members a seen in end view; that shown in Fig. 6 has a single recess receiving the notched end of one of the two suspension rods of the rack, if use is made of a movable member for each rod, or the rear rod of a rack and the front rod of the adjacent rack, if a folio of two racks is hung from the same member.

The member shown in Fig. 7 receives at the front in the first recess the rear rod of the rack and, in the second recess, the front rod of the adjacent rack.

Of course, in certain particular cases, by using plane or slightly curved suspension rods, both rods of a rack can be hung in the member of Fig. 6 or one rod in each recess of the member shown in Fig. 7.

The recess formed in said members is inclined (1 in Figs. 6 and 7) so as to facilitate the introduction of the rods.

The bottom of the recess can be flat as in Fig. 6, or have another shape, for instance a ridge, as shown at 2 in Figs. 2 and 7.

It will be noted that the part connecting the heel-piece to the members shown in Figs. 1 to 5 is thinner than the member, as indicated at 3 in Figs. 6 and 7, in order to facilitate the placing in position of the members and the interposition of new members on the part or parts serving as a support, as will be seen later on in Figs. 20 to 23.

Fig. 8 is a flat view of the folder or rack; the parts 4, 5 and 5, 6 constituting the two folder leaves or folios are of different heights.

The line 4 and 6 of each leaf or folio also determines their height, line 5 being the bottom fold or lower back.

The parts shown at 7 and 8 form the flaps necessary for holding the suspension rods of Figs. 9 and 11.

The folds 4, 9, 10 and 11 of the flap 8 serve to conform to the shape of the profiled rod of Fig. 13 the detail of assemblage of which will be defined hereinafter, the part located between the lines 4 and 9 being adapted to bear the inscriptions or titles. This method of assemblage can be of any other type without departing thereby from the invention.

The crinkled or weakening lines indicated at 12 form the hinge of the large inner flap, however, this flap may not be used or may be shorter and comprise no hinge folds.

The perforations shown at 13 and 14 serve to assemble the rods of Figs. 9 and 10 to the rack, said perforations can be provided at 15 and 16 or otherwise, according as the securing claws of the rods are placed on one face or the other or on both faces.

These perforations can be provided in a more or less large number and preferably of rectangular shape, as indicated at 13, or in the shape of a half-circle, as shown at 15, or both as indicated at 14 and 16.

However, for obtaining the maximum strength, the row 17 of said perforations which forms the bearing point of the rods in the claws, will always be parallel to the folds 4 and 6.

The perforations located at 18 serve, once the rack is closed, to see if it contains documents.

The notches 19 allow, by engaging in the vertical claws of the rods, to ensure the locking of the whole assembly and to allow, in case of wear of the rack, the rods to be easily taken to pieces and recovered; the locking as well as the assemblage of the rods in the rack can also be effected by other means, such as hooks or metal eyelets.

Fig. 9 illustrates a suspension rod b which fits in the flap 8 of the rack shown in Fig. 8, said rod, preferably made of steel is cut out at its ends; the notches 20 can have different shapes according to the profile of the recesses formed in the movable members, Figs. 6 and 7, so as to conform to the same and to thereby avoid any lateral play prejudicial to the alignment of the titles of the racks.

The claws 21 serve for securing the rack to the rod owing the the perforations 13 to 16 of Fig. 8, they can be provided in a more or less large number and on a single face or distributed on both faces; said claws can be placed at the lower edge of the rod, as shown in Fig. 11.

The claws 22 allow the rack to be locked in the notches 19 and prevent the rod from becoming detached.

This rod b can be higher than the rod c shown in Fig. 11 in order to allow the portion 23 which is folded and forms the support or small back of the rack placed between the lines 4 and 9 of Fig. 8, to engage above the other folio of the rack, as will be shown later on.

Fig. 10 is an end view of the rod b of Fig. 9.

Fig. 11 is a modified form of the rod shown in Fig. 9.

Fig. 12 is an end view of Fig. 11; it will be noted that the position of the horizontal claws 21 and vertical claws 22 can be reversed relatively to Fig. 10.

Fig. 13 is a plan view of the rod c of Fig. 11. It will be noted that the claws 21 are embossed on both faces of the rod.

The portion 24 constituting the ends is curved or folded so as to allow the rack to be removed or opened easily, as will be shown later on.

Figs. 14 to 18 show various embodiments of supporting bars d for ensuring the support and sliding of the movable members shown in Figs. 1 to 5. These bars or angle members are assembled on either side of an armature forming a support per pair, if use is made of bars as those shown in Figs. 14 and 18, or for each one, if use is made of the various angle members shown in Figs. 15, 16 and 17.

Fig. 19 shows the bars d of Fig. 14 assembled per pair on either side of supporting legs, as well as a movable member a of Fig. 1 placed in position.

Figs. 20 and 21 illustrate the introduction of the movable members a of Figs. 1 and 2 between the bars d and the profile of Figs. 14 and 15 constituting the means for ensuring the support and sliding of said members.

Figs. 22 and 23 show the member a placed in position, it is therefore necessary to cause it to effect a quarter of a revolution after its introduction.

It will now be understood that it is necessary to use members having a stem 3 shown in Figs. 6 and 7 as thin as possible, otherwise it will be impossible to obtain such an assemblage, allowing the easy introduction of the members and in particular, the addition of new members among the others without it being necessary to introduce them only at one end of the tray or frame, this requiring its taking to pieces and the changing of the position of all the racks when one or more are to be interposed.

Fig. 24 shows a member a of the same shape as that of Figs. 1 and 6, but the stem or heel-piece 3 of which has not been reduced in depth so as to show that it is impossible to cause it to enter the profile of Figs. 14, 15 and 18, for instance.

Fig. 25 shows that said member a, seen at the other edge, can only be placed in position through the end of the bars or profiled members of Figs. 14 to 18, that is to say, it would be necessary to take the whole device to pieces to introduce new members.

Fig. 26 shows the securing in position of the rack shown in Fig. 8 to the rod illustrated in Fig. 9; the points 4, 9, 10 and 11 correspond to the same tracing or folding lines of Fig. 9, as above indicated, thus, the back bearing the title is clearly visible and efficiently supported by the folded part of the rod or bar.

At 21 and 22, the horizontal and vertical claws of the rod shown in Fig. 9 are placed in the perforations 15 and notches 19 of the rack shown in Fig. 8; the securing in position is reinforced at 28 by stitching; the flap of Fig. 8 is shown at 8 with its crinkled lines.

Fig. 27 shows in section the assemblage of the two rods of Figs. 9 and 11 to the rack.

It will be noted that the rod of Fig. 11 is not so high as that of Fig. 9, so as to engage under the folded part 23, in order to form less thickness and allow, when the racks do not contain a volume of papers exceeding the width of the folded part 23, to place a larger number thereof in the cabinets.

The rod shown in Fig. 11 is not provided with a vertical claw at its ends, which is optional and is not prejudicial in any way to the firmness of the structure.

Fig. 28 is a perspective view of the assemblage of a few racks or files e on the movable members a of Figs. 1 to 5. It will be noted that for this example, use is made of the accordion principle, each member locks the rear and front suspension rods of the preceding rack and the following rack, except, of course, for the first and the last, but for these two racks, use can be made of thinner movable members.

The rack Duval is pushed back, its front wall remains attached to the rear wall of the rack Dussar, it is therefore impossible to place a document between both racks.

Fig. 29 shows that it is easy to extract a rack e, even with a finger, owing to the folding of the rods and that it is impossible to place a file in the rack unless it has been taken out therefrom or another one removed, as one cannot be interposed between two others unless a new member is placed at the required spot on either side of the frame, after having separated the front and rear walls of the preceding and following files, the rods of which are replaced in position afterwards; it will be noted that it is only necessary to push with a finger the curved part of the rods to effect the opening.

Fig. 30 is an end view of Fig. 29, it will be seen that it is easy to effect the introduction of a rack e which has been taken out, its place remains free, its own weight being sufficient for ensuring its correct placing in position.

Fig. 31 shows how the ends of the bars or rods d of Fig. 14 or 18 are cut out in order to be assembled with the legs to form the frame without necessitating screws or nuts.

Fig. 32 illustrates the end 29 of the leg shown in Fig. 19 which has been perforated for allowing the passage and the straightening of the bars d of Fig. 31, and provided with two claws 30 for allowing a member f, Fig. 33, in the shape of a comb, to be secured in position.

Fig. 33 shows said comb member f serving to hold the two bars of Fig. 31; its engagement in the two claws is adapted not only to maintain and also to ensure the rigorous spacing apart of both bars shown in Fig. 31, but also that of both pairs of bars of Figs. 33 and 34.

Fig. 34 illustrates a sectional view of the assemblage.

What I claim as my invention and desire to secure by Letters Patent is:

1. In a filing device utilizing parallel supporting rails carrying slidable support members serving to support end projections or supporting bars of folders to be suspended between said rails, the combination of two retaining edges spaced apart upon each rail for retaining the support members captive upon said rails, and undercut portions in two opposite sides of each support member forming clearances allowing the two retaining edges of the rail to extend into said sides, the upper and lower portions of each support member extending out a sufficient distance over and under said retaining edges, respectively, to prevent accidental removal of said support member from its supporting rail.

2. A filing device according to claim 1, having two rail members constituting the spaced retaining edges in each rail so as to expose the wider upper and lower portions of each supporting member to view respectively above and below the rail members.

3. A filing device according to claim 1, having two rail members constituting the spaced retaining edges in each rail, each supporting member having a sufficiently small lateral dimension to allow turning the same a quarter turn about a vertical axis for insertion into or removal from between the rail members.

4. A filing device according to claim 1, wherein each supporting member has a sufficiently small lateral dimension to allow turning the same a quarter turn about a vertical axis for insertion into or removal from between the rail members.

RAYMOND ARTHUR.
EUGÈNE GUICHARD.